Aug. 5, 1924.

F. J. BAST

1,503,971

AUTOMATIC CONTROLLER

Filed Jan. 3, 1923

Inventor
FRANK J. BAST

By his Attorneys

Aug. 5, 1924.  
F. J. BAST  
AUTOMATIC CONTROLLER  
Filed Jan. 3, 1923

Inventor  
FRANK J. BAST  
By his Attorneys

Aug. 5, 1924.

F. J. BAST 1,503,971

AUTOMATIC CONTROLLER

Filed Jan. 3, 1923

Inventor
FRANK J. BAST
By his Attorneys

Patented Aug. 5, 1924.

1,503,971

UNITED STATES PATENT OFFICE.

FRANK J. BAST, OF BROOKLYN, NEW YORK, ASSIGNOR TO CHARLES J. TAGLIABUE MFG. CO., OF BROOKLYN, NEW YORK, A CORPORATION OF NEW YORK.

AUTOMATIC CONTROLLER.

Application filed January 3, 1923. Serial No. 610,532.

*To all whom it may concern:*

Be it known that I, FRANK J. BAST, a citizen of the United States, and resident of the borough of Brooklyn, county of Kings, city and State of New York, have invented certain new and useful Improvements in Automatic Controllers, of which the following is a specification.

My invention relates to automatic controllers and more particularly to fluid operated controllers of the type commonly used for controlling temperature, humidity, pressure, liquid levels and other internal conditions in a given element and has for its primary object to provide an improved construction in which deficiencies inherent in existing instruments are overcome in a novel and efficient manner. My invention further contemplates the provision of an improved controller arranged to function accurately and capable of being easily adjusted for any desired temperature, humidity, pressure, liquid level or other predetermined condition and so constructed as to be readily disassembled for cleaning or inspection purposes without interference with any adjustments for which the instrument is set. Other and more specific objects will appear from the description hereinafter and the features of novelty will be pointed out in the appended claims.

In the accompanying drawings, which, without defining the limits of the invention, illustrate it in a form for automatically controlling temperature, Fig. 10 is a rear face view of the bellows supporting bracket; Fig. 10$^a$ is an edge view of said bracket looking in the direction of the arrow in Fig. 10, the bracket in Figs. 10 and 10$^a$ being reversed with respect to its position in Fig. 2

Figure 1:
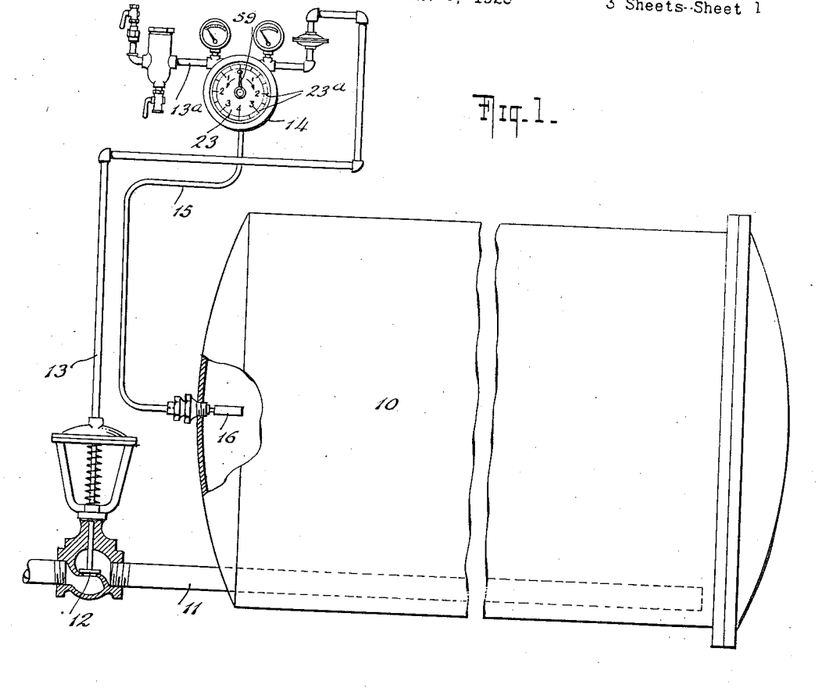
Fig. 1 is a diagrammatic view of a typical installation including the controller.

In the illustrative installation shown in Fig. 1, 10 represents a hot water tank which is heated interiorly by means of a steam coil 11 through which the flow of steam is regulated by means of a diaphragm motor valve 12; the latter opens, closes or throttles in response to the air pressure whereby said valve is operated and which is supplied by the pipe-line 13 leading from the controller 14. A capillary tube 15 connects said controller 14 with a thermostatic bulb 16 which projects into the hot water tank 10, so that the controller is actuated to vary the air pressure in accordance with the temperature effective upon said bulb 16. That is to say, when the temperature at the bulb 16 increases, the controller 14 causes an increase of air pressure to be transmitted through the line 13 to the diaphragm-motor valve 12 which in consequence moves toward its closed position and diminishes the supply of steam to the coil 11. On the other hand when the temperature at the bulb 16 decreases, the controller 14 causes a diminished air pressure in the line 13 and as a result permits the valve 12 to move toward its open position, by the action of its spring, to increase the amount of steam which passes to the coil 11. In this way the temperature of the water in the tank 10 is maintained at a substantially constant point, it being understood that the above is an explanation of the general operation of typical controllers of the kind to which the present invention relates; the latter is concerned primarily with improvements whereby an increased accuracy and flexibility in the operation of the controller with greater convenience to the operator is secured.

The controller, as is customary may comprise a support 17 of suitable form provided with means, such as brackets 18, whereby the same may be fixed in operative position; a cover in the form of a casing 19 is hinged at 20 upon the support 17 and is provided with a glass or other transparent front 21, it being understood that any conventional type of locking means 22 may be provided for locking the casing in its closed position upon the support 17. A dial 23 is mounted in the casing 19 so as to be visible through the front 21 and is provided with a scale 23ª which preferably reads in two directions from zero to a common point as will be more fully described hereinafter.

Figure 2:
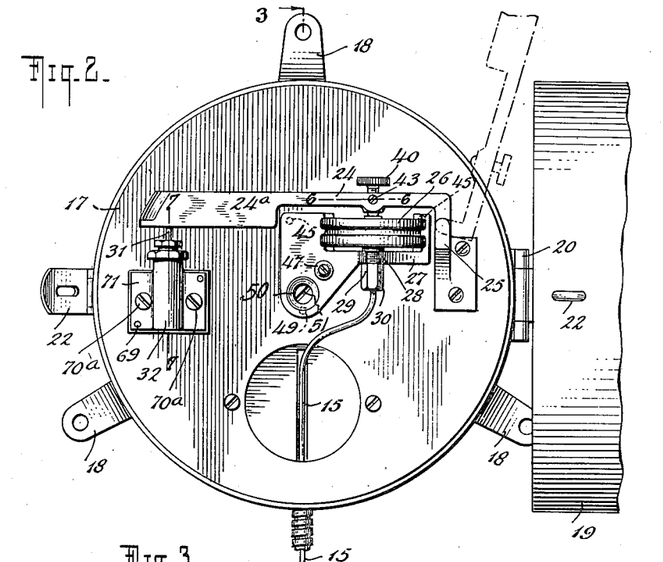
Fig. 2 is a front elevation of a controller embodying the invention.
Figure 4:
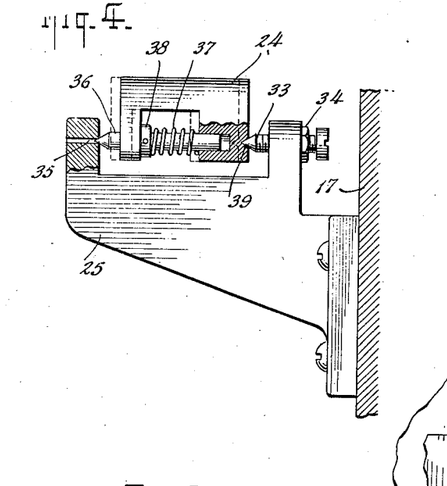
Fig. 4 is a detail view illustrating a preferred mounting for the transmitting lever.
Figure 5:
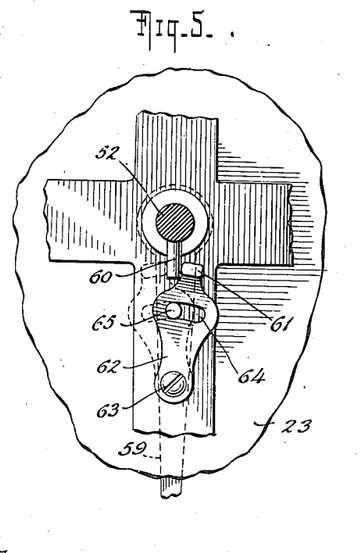
Fig. 5 is a detail section on the line 5—5 of Fig. 3.

Controllers of the type under discussion are almost invariably fixed upon a wall, post or the like with the dial 23 in an upright position in order to facilitate the reading thereof. Heretofore this arrangement has included an upright transmitting lever which swings about a horizontal axis in horizontal directions in such a manner as to require the use of a spring for holding it in operative relation to the customary bellows. Obviously because of the uncontrollable variations in the tension and action of such springs the operation of the arrangement set forth is liable to be erratic. The present invention overcomes this possibility by doing away with the necessity for the springs referred to and provides a gravity controlled member or transmission lever 24 which is mounted in such a manner as to swing in vertical directions and be held in operative relation to said bellows by its own weight or by the action of an additional weight provided for the purpose. Thus in the illustrated example the gravity controlled member or transmission lever 24 is pivotally mounted upon a bracket 25 which is secured to and projects outwardly from the support 17, said lever at its free end being weighted as indicated at 24ª. The lever 24 extends over the bellows 26 which may be termed a controlling device or a device sensitive to temperature variations, said bellows being mounted in a horizontal position, or in other words in a position at right angles to the support 17, upon a bracket 27 which is secured upon the latter in a novel manner to be more fully set forth hereinafter. To permit the bellows 26 to be readily connected with and disconnected from the bracket 27, the latter is provided with a fork 28 into which the screw-threaded stem 29 of said bellows 26 is fitted, a lock 30 being provided for securing the stem 29 in said fork; the capillary tube 15 which leads to the bulb 16 is connected with the stem 29 and thereby establishes communication between said bulb and the interior of the bellows 26. The transmission lever 24 further projects over and engages the stem 31 of the air valve 32 which is connected by means of the pipe-line 13 with the diaphragm motor valve 12 and with a source of air under pressure by means of the inlet line 13ª; the air valve 32 which may be termed a governing device, is mounted upon the support 17 in a novel manner which will also be fully described hereinafter. In addition to the other advantage secured by mounting the lever 24 in the manner shown and described, the arrangement permits said lever to be swung back, to the position indicated by dotted lines in Fig. 2 when the casing 19 is open. In this position of said lever 24 the other parts of the instrument are freely accessible for purposes of inspection, replacement and the like. In some cases this mere swinging back of the lever may not be sufficient and it may be desirable to completely remove said lever from the instrument; to avoid the necessity for complete readjustment of the setting subsequent to the replacing of said lever in position such removal is accomplished in the present construction without in any way disturbing the setting adjustment of the instrument, which heretofore has not been possible. To accomplish the desired result the bracket 25 is provided with a pointed bearing pivot in the form of a screw 33, which is screw-threaded into one arm of said bracket and fixed in position by means of a lock nut 34 in the usual way; the other arm of said bracket is provided on its inside face with a recess 35 in axial registry with the point and axis of the screw 33. A second pointed bearing pivot 36 in the form of a plunger is slidably mounted in the end of the lever 24 and projects beyond the same as shown in Fig. 4; a spring 37 bears with one end against the lever 24 and with the other end against a collar 38 carried by the plunger 36 and thus tends to press the latter normally outward, it being understood that the collar 38 limits said outward movement of said plunger. In addition the lever 24 is provided upon the outside face opposite to that through which the plunger 36 projects, with a recess 39 located in axial registry with said plunger.

With this arrangement, when the lever 24 is mounted in the bracket 25, the pointed end of the screw 33 fits into the recess 39 of the lever 24 and the pointed end of the plunger 36 likewise fits into the recess 35 of said bracket 25. The two members 33 and 36 thus provide a pivot on which said lever 24 is capable of such pivotal movements as may be required. To remove the lever 24 a transverse pressure is exerted thereon in a direction to compress the spring 37 and to slidably move said lever upon the plunger 36 a sufficient distance, as indicated by dotted lines in Fig. 4, to detach the recess 39 from the pointed end of the screw 33; this permits the end of the lever 24 to be tilted and removed from the bracket 25. To replace the lever 24 the pointed end of the plunger 36 is first inserted into the recess 35 of the bracket 25 and the lever is again pressed against the tension of the spring 37 and moved into the bracket 25 to bring the recess 39 into registry with the screw 33. If pressure is now removed from said lever the spring 37 will again cause both pivot members 33 and 36 to properly bear in their respective recesses. Both of the described operations are accomplished without disturbing the setting of the instrument and at the same time the desired pressure of the bearings or pivot members is preserved and requires no re-adjustment.

Figure 6:
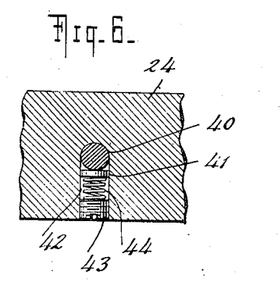
Fig. 6 is a fragmentary section on an enlarged scale taken on the line 6—6 of Fig. 2 and illustrating the method of mounting the adjusting screw upon the transmitting lever.

As it is necessary, in controllers of the kind referred to, in order to secure the desired range of efficiency to provide for changes in the setting point of the instrument, the following novel means is provided for this purpose. In the first place the transmitting lever 24 is provided with an adjusting post or screw 40 in registry with the bellows 26 and adapted to be acted upon by the same, said screw 40 being adjustable on said lever 24 with respect to said bellows. While this adjusting screw 40 should be capable of being easily moved by the fingers it is at the same time desirable to prevent the same from being unintentionally shifted, for instance by vibration, and thereby changing the setting point of the controller. To avoid this possibility a permanently effective friction means is provided for said screw, said means, in the illustrated example as shown in Fig. 6, comprising a disk 41 of suitable material such as indurated fibre, bearing against said screw 40 and located in a recess 42 which is bored through the lever 24 and has its outer end internally screw-threaded. A screw plug 43 fits with the screw-threaded end of said recess 42 and provides an abutment for one end of a compression spring 44, the other end of which engages the disk 41 and presses the same against the screw 40. By adjusting the plug 43 the tension of the spring 44 may be adjusted to vary the pressure exerted by the disk 41 upon the screw 40; in this way just the amount of resistance against unintentional rotation of said screw 40 is secured without interfering with the ready actuation thereof by the fingers and said screw is positively held in any adjusted position.

Figure 3:
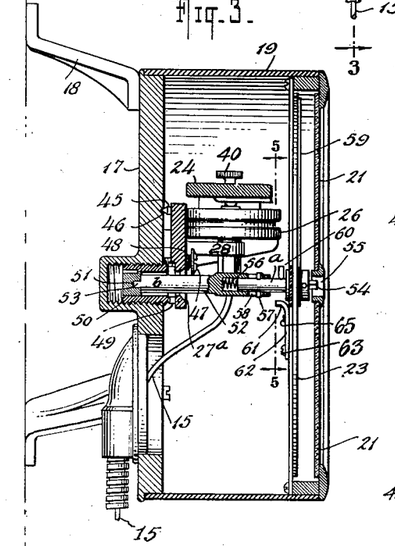
Fig. 3 is a vertical section on the line 3—3 of Fig. 2.
Figure 11:
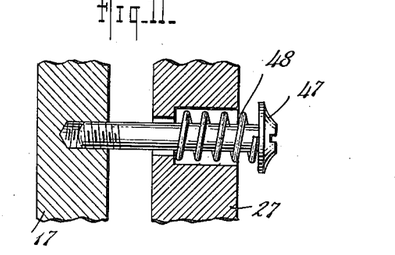
Fig. 11 is a detail view showing in part the mounting therefor.

To increase the range of adjustability of the instrument beyond that provided by the screw 40, the bracket 27 which carries the bellows 26, is formed in its rear face with two preferably tapered projections 45 arranged in engagement with recesses 46 located at the proper points upon the support 17; a screw 47 extends loosely through the bracket 27 as shown in Fig. 11 and screws into the support 17 and is provided with a spring 48 which by bearing against the head of said screw and the bracket, mounts the latter upon said support in a flexible, yielding manner. The bracket 27 is provided with a lug 49, which projects from its inner face and rests against the edge of a screw-threaded bushing 50 which is screw-threaded into the support 17 as shown in Fig. 3. By rotating the bushing 50 in a clockwise direction, it will be screwed further into the support 17, the lug 49 by the action of the spring 48 following this movement of the bushing; this causes the bracket 27 to rock on the projections 45 in a direction toward the support 17 and correspondingly shifts the bellows 26 which accordingly moves away from the screw 40 of the transmission lever 24. With this adjustment the bellows 26 will have to expand to an increased extent before contact with the screw 40 and actuation of said lever 24 is effected. Contrarywise if the bushing 50 is rotated counter-clockwise it will be screwed out of said support 17 and will consequently swing the bracket 27 in a direction to bring the bellows 26 nearer to the screw 40; said bellows is thus required to expand to a lesser extent in order to effect engagement with said screw 40 and to bring about an actuation of the lever 24. In this way any desired adjustment may readily be secured. Any suitable means may be utilized for rotating the bushing in the described manner; for instance said bushing may be provided with a slot 51 for the accommodation of a screw-driver or the like; in such case the bracket 27 includes an opening 27ª in registry with said bushing through which the screw-driver may be inserted.

In the preferred arrangement the rotation of said bushing and the setting thereof at the desired point is facilitated by providing a shaft 52 journalled in the casing 19 and having at its one end a lip 53 adapted to fit into said slot 51, the other end of said shaft being formed with a squared head 54 for the accommodation of a suitable key; the latter is inserted through an opening 55 provided in the front 21 for this purpose. To maintain the shaft 52 in proper connection with the slot 51, when the casing 19 is closed, said shaft is preferably made in two sections $a$ and $b$ telescopically arranged and including a spring 56 which tends to press the section $b$ away from the section $a$. The parts are so arranged and proportioned that the spring 56 is placed under tension and compressed somewhat when the casing 19 is closed and thus exerts a pressure upon the section $b$ whereby the lip 53 is positively maintained in the slot 51. A pin 57 is carried by the shaft section $a$ and slidably fits with a slot 58 of the shaft section $b$ for the purpose of causing both sections to rotate as a unit without interfering with the relative lengthwise movements thereof. The shaft 52 as a whole is automatically engaged with the bushing 50 whenever the casing 19 is closed and is automatically disengaged therefrom each time said casing is opened. With the described arrangement, by applying a proper key to the head 54 the shaft 52 and with it the bushing 50, may be adjusted to bring about any desired setting of the instrument.

For the purpose of visibly indicating the setting of the instrument a pointer 59 is mounted upon the shaft 52 in position to swing across the face of the dial 23 in operative relation to the scale 23ª thereof. The latter, as shown in Fig. 1, reads from zero in opposite directions to a common point diametrically opposite and in the illustrated example is divided in tenths and numbered from one to four. Thus when a higher setting is desired the mechanism is adjusted in a direction to move the pointer 59 counter-clockwise to the point on the left hand scale indicating the desired setting; likewise when a lower setting is desired the pointer 59 is shifted clockwise to the point on the right hand scale which indicates the desired lower setting. The pointer 59 is prevented from being shifted more than a half revolution from the zero mark by means of the following stop arrangement. To the rear of the dial 23 the shaft 52 is provided with a pin 60 which, by engagement with a stop 61 from opposite directions arrests the movement of said shaft and consequently of the pointer 59 in said directions and prevents movement beyond the point four of the scale 23ª either in a clockwise or counter-clockwise direction. To arrest the movements in the described manner each time the pointer 59 is in exact registry with the point four of said scale, the stop 61 is movable; that is, it is carried by a member 62 which is pivoted at 63 upon the rear of the dial 23 in line with the zero mark. The member 62, preferably at a point between the stop 61 and pivot 63, is provided with a slot 64 corresponding in effective length with the width of the stop 61; a stationary pin 65 projects through said slot 64 and permits the member 62 to pivot on the screw 63 within the limits of the slot 64 only. The parts are so located and proportioned that when the shaft 52 and with it the pointer 59 is rotated in one direction or the other, the pin 60 will engage the stop 61 and cause it to yield to the extent of the slot 64 which brings the pointer 59 into accurate registry with the indication four of the scale or its equivalent.

If it is desired to change the temperature adjustment more than can be done by adjusting the parts to an extent corresponding to a movement of the pointer 59 from zero to a point diametrically opposite, an initial approximate adjustment is first made by properly adjusting the screw 40. After this has been done, the exact temperature setting which is desired may be secured by shifting the pointer 59, from the zero point to the predetermined point on the scale whereby the mechanism is correspondingly adjusted in the manner previously set forth. Thus by having the screw 40 located at some neutral point the setting adjustments may be effected entirely by means of the bushing 50 and its co-related parts or said screw 40 and said bushing 50 may be used in co-operation with each other to provide the desired setting.

In practice when the temperature at the bulb 16 rises sufficiently, the expansion of the fluid therein, transmitted through the capillary tube 15, causes the bellows 26 to expand and, by contact with the adjusting screw 40, pivotally raises the transmitting lever 24 away from the stem 31 of the air valve 32. This causes said valve to function in such a manner, to be more fully explained hereinafter, that the diaphragm motor valve 12 will automatically regulate and control the supply of steam to the coil 11.

Figure 7:
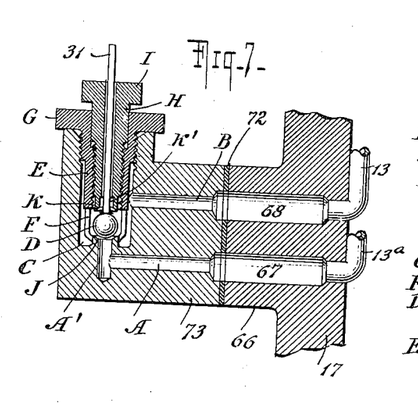
Figs. 7 and 8 are fragmentary sectional views on an enlarged scale both taken on the line 7—7 of Fig. 2 and illustrating the interchangeability of different types of air valves.
Figure 8:
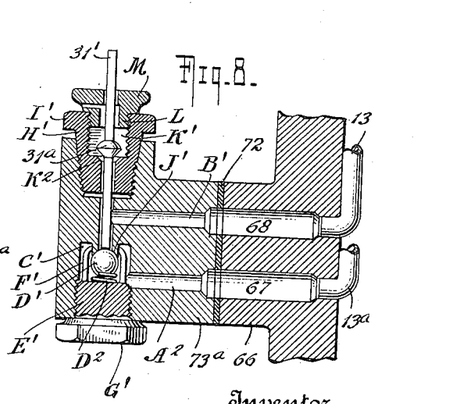
Figure 9:
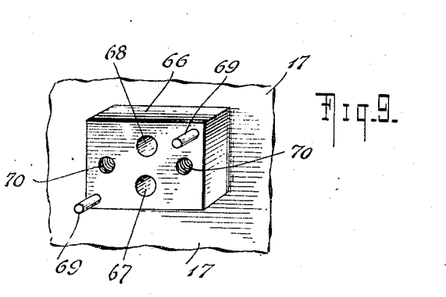
Fig. 9 is a fragmentary perspective view of the boss on which said air valves are mounted.
Figures 10, 10A:
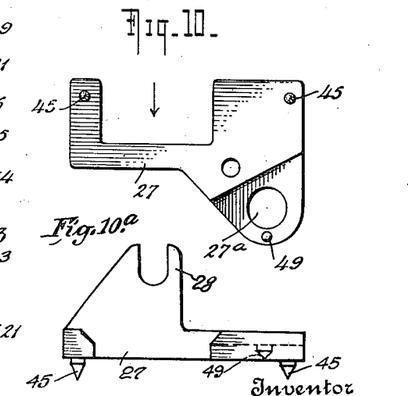

Generally speaking the air valves of the type herein referred to which control the customary diaphragm motor valves are made in two forms, one of which for the purpose of distinction, is termed a direct acting valve and the other a reverse acting valve; the first-mentioned type closes where air pressure is applied to its valve member while the second type opens when its valve member is subjected to air pressure. In addition to the features so far described the present arrangement includes a novel mounting which permits ready interchangeability of the two classes of valves above set forth. As shown in Figs. 7, 8, and 9, a boss 66 projects from the face of the support 17 and is provided with open ended passages 67 and 68 communicating respectively with the air inlet line 13ª and the pipe line 13 which leads to the diaphragm motor valve 12. Pins 69 project outwardly from the face of the boss 66 which is further provided with screw-threaded apertures 70 for the reception of screws 70ª whereby the selected valve is secured in place. Each valve, regardless of type, includes a base 71 having openings which set over the pins 69 to properly position the valve on the boss 66 and with apertures through which the screws 70ª pass to fix the valve in place; a suitable gasket 72 is preferably located upon the face of the boss 66 to make the connection air-tight. With this arrangement all that is required, when it is desired to substitute one valve for another, is to remove the screws 70ª and the valve secured thereby; the new valve may then be placed in position by setting the proper openings over the pins 69 and replacing the screws 70ª. In order that the action and construction of the two types of valves herein referred to may be fully understood, I add hereto a description thereof, although it will be understood that said valves, per se, form no part of the present invention.

A direct-acting air valve such as is shown in Fig. 7 consists of a suitable body 73 with passages A and B and the chamber C drilled out, said passages A and B being in communication respectively with the passages 67 and 68 of the boss 66. A ball D is held in the removable cage fitting E which is provided with the fingers F, an external thread and a wrench head G. This cage fitting E is also provided with an internal thread which receives the valve-stem bushing H also provided with a wrench head I. These parts are assembled as follows: The stem 31 which is provided with a slight head is entered into its hole in the bushing H from the lower or seat end and the ball D is entered into the cage fitting E from the wrench head end. The bushing H is then screwed into the cage fitting E and the latter is then screwed home into the body 73. By adjusting the bushing H, the ball D is brought into exactly the right relationship; a matter of only a few thousandths of an inch, with both the lower and upper seats J and K. Without disturbing the relationship required to get the most accurate results from the controller, however, the cage fitting E may be removed at any time for inspection and cleaning of the valve ball, etc., and without either the ball D or stem 31 falling out of the assembly.

The direct-acting air valve functions as follows: When the transmission lever 24 of the controller is not in contact with the valve stem 31, the full air pressure is effective on the diaphragm motor valve 12. The air supply reaches the air valve through the passage A which communicates with the passage 67 and ends in port A' provided with the beveled seat J above which the valve ball D is located. Because of the freedom of the valve stem 31 the air pressure is enabled to raise the ball D and enters the chamber C from whence it cannot escape to the atmosphere because the air pressure keeps the ball D against the upper seat K which is the beveled edge of the escape port K', the latter being located at the end of the hole drilled in the valve stem bushing H and through which hole the stem 31 passes loosely. The chamber C is then only in communication with outlet B which communicates with the passage 68 leading to the diaphragm motor valve which latter, therefore, receives the fuel air pressure and closes.

If the transmission lever of the controller pushes against stem 31 only to an extent to move the ball D from its upper seat K without however bringing it against its lower seat J, the air pressure entering the chamber C will be partly relieved through the leak afforded by the loose fit of stem 31 within its hole in the valve stem bushing H. Thus only a part of the air pressure from supply passage 67 is effective upon the diaphragm motor valve, which as a result is only partly closed and thus throttles the supply of steam without cutting it off entirely.

When the transmission lever of the controller presses against stem 31 sufficiently to hold the ball valve D tightly against the lower seat J, the air pressure supply to the diaphragm motor valve will be cut off, while any pressure existent on the diaphragm top of the motor valve is free to be relieved to the atmosphere, as no air can enter through supply port A' while the escape port K' is open. Under such conditions the diaphragm motor valve 12 will be fully opened by the action of its spring.

A reverse acting air valve such as illustrated in Fig. 8, consists of a suitable body 73$^a$ with the passages A$^2$ and B' and the chamber C' drilled out, as shown, the passages A$^2$ and B' being arranged for connection with the passages 67 and 68 of the boss 66. The ball D' is held in the removable cage fitting E' which is provided with the fingers F' between which the ball D' is entered, by springing apart said fingers, after the spring D$^2$ has been dropped into the recess provided for it. The cage fitting E' is arranged with an external screw thread and a wrench head G' and is removable at will, for inspection and cleaning without having the ball drop out. The stem 31' is held by the bushing H', provided with a wrench head I' and screw thread which screws into the body 73$^a$. By adjusting bushing H' the seat K$^2$ is raised or lowered so that the relationship of the lower and upper seats J' and K$^2$ upon which the most accurate functioning of the controller is dependent, can be arranged as conditions require. This adjustment need not be disturbed, however, for inspecting and cleaning the valve stem either as the latter is held in the bushing H' by the screw-threaded collar L, provided with milled head M. Thus by unscrewing collar L, stem 31' can be removed without disturbing bushing H'.

The described acting air valve functions as follows: When the transmission lever of the controller presses sufficiently against the stem 31', the full air pressure is effective on the diaphragm motor valve and the latter is fully closed. The air supply reaches the air valve through the passage A$^2$ which communicates with the chamber C' the latter being provided with a supply port having the seat J' from which in this case the valve ball D' is pushed away against the resistance of the compression spring D$^2$. The full air pressure thus is communicated through outlet passage B' to the diaphragm motor valve, no pressure escaping as valve-disc 31ª, provided on the stem 31' is held, in this case, against the seat K² of escape port K'. The diaphragm motor valve 12 is accordingly fully closed.

In the case of a reverse-acting air valve, if the transmission lever of the controller pushes against the stem 31' only to an extent sufficient to move the ball D' away from its seat J' without the disc 31ª being brought against its seat K² the air pressure entering the chamber C' is partly relieved through the leak afforded by the loose fit of stem 31' within its hole in the valve-stem bushing H'. Thus only a part of the air pressure from supply passage A² is effective on the diaphragm motor valve, which as a result is partly open and throttles the steam supply.

Also, in the case of a reverse-acting valve, when the transmission lever of the controller is not in contact with the valve stem 31', the air pressure supply to the diaphragm motor valve is cut off, while any air pressure existent on the diaphragm top of the motor valve is free to be relieved to the atmosphere, as no air can enter through the supply port; the escape port is, however, open due to the action of spring D² against the ball D' which, in turn, presses stem 31' upward also. The diaphragm motor valve 12, as a result, is fully open.

The invention provides a controller which is more efficient and more easily operated than heretofore and in which all of the parts are readily accessible for any purpose. Because of the fact that spring control of the transmission lever is done away with and because the weight thereof is constant in its action a closer and more reliable automatic control is provided than has previously been possible. The invention does away with the shortcomings of existing instruments and provides a controller which is positive and uniform in its efficiency.

Various changes in the specific form shown and described may be made within the scope of the claims without departing from the spirit of my invention.

I claim:—

1. In an automatic controller, the combination of a controlling device, a governing device, a gravity-controlled member arranged to be operated by said controlling device to control the operation of said governing device, means for changing the adjustment of the controller, said means being operatively movable in directions transverse to the plane of movement of said member and a dial located in a plane parallel with said plane of movement of said member for indicating the adjustment.

2. An automatic controller comprising a support, a sensitive device mounted thereon, a governing valve, a gravity-controlled lever arranged to be operated by said sensitive device to control the operation of said governing valve, means for changing the adjustment of the controller, said means being operatively movable in directions transverse to the plane of movement of said lever and a dial located in a plane parallel with said plane of movement of said member for indicating the adjustment.

3. An automatic controller comprising a support, a bellows sensitive to temperature changes mounted upon said support and expansible in a direction parallel with the plane thereof, an air valve mounted upon said support, a transmission lever pivotally mounted on said support to swing about an axis perpendicular thereto, said lever extending over said bellows and above said air valve and moving toward the same by gravity, means for changing the adjustment of the controller, said means being operatively movable in directions transverse to the plane of movement of said lever and a dial located in a plane parallel with said plane of movement of said member for indicating the adjustment.

4. In an automatic controller, the combination of a device sensitive to variations in temperature, a governing device and a pivoted transmission lever operated by said sensitive device to control the operation of said governing device, said lever being pivotally movable to an inoperative position away from said devices to render the same freely accessible, means for changing the adjustment of the controller, said means being operatively movable in directions transversely to the plane of movement of said lever and a dial located in a plane parallel with said plane of movement of said member for indicating the adjustment.

5. In an automobile controller, the combination of a device sensitive to variations in temperature, a governing device, a bracket, a transmission lever operated by said sensitive device to control the operation of said governing device, means whereby said lever is removably pivoted on said bracket, means for changing the adjustment of the controller, said means being operatively movable in directions transverse to the plane of movement of said lever and a dial located in a plane parallel with said plane of movement of said member for indicating the adjustment.

6. In an automatic controller, the combination of a support, a bellows sensitive to temperature changes mounted upon said support, an air valve mounted upon said support, a bracket on said support, a transmission lever controlled by said bellows and controlling said air valve, a pivot member carried by said bracket and engaging said lever and a spring controlled pivot member slidably carried by said lever and engaging said bracket, said spring controlled pivot member being adjustable to a position on said lever to permit disconnection thereof from said bracket.

7. In an automatic controller, the combination of a device sensitive to variations in temperature, a governing device, a member arranged to be operated by said sensitive device to control the operation of said governing device and means whereby said sensitive device is shifted relatively to said member to vary its operative relation thereto and thereby change the setting point of said controller.

8. An automatic controller comprising a support, a governing valve thereon, a transmission lever pivoted upon said support for controlling the operation of said governing valve, a bracket movably mounted upon said support, a device sensitive to temperature carried by said bracket for operating said transmission lever and means for adjusting said bracket relatively to said support to shift the position of said sensitive member relatively to said lever and thereby vary the setting point of the controller.

9. An automatic controller comprising a support, a governing valve thereon, a transmission lever pivoted upon said support to swing about a pivot perpendicular to said support and arranged to control the operation of said governing valve, said lever being movable toward said valve by gravity, a bracket pivoted upon said support, a temperature sensitive bellows carried by said bracket for operating said transmission lever and a bushing adjustably mounted on said support for pivotally adjusting said bracket to shift the position of said bellows relatively to said lever and thereby vary the setting point of said controller.

10. An automatic controller comprising a support, a casing hinged thereon, an air valve mounted on said support, a gravity-controlled transmission lever pivoted upon said support to swing about an axis perpendicular thereto for controlling the operation of said valve, a bracket pivotally mounted upon said support, a temperature sensitive bellows carried by said bracket for operating said lever, a bushing adjustably mounted on said support for pivotally adjusting said bracket to shift the position of said bellows relatively to said lever and thereby vary the setting point of the controller and a key-operated shaft rotatably carried by said casing for rotating said bushing.

11. An automatic controller comprising a support, a casing hinged thereon, an air valve mounted on said support, a gravity controlled transmission lever pivoted upon said support to swing about an axis perpendicular thereto for controlling the operation of said valve, an adjusting screw on said lever, a bracket pivotally mounted upon said support, means for yieldingly resisting the pivotal movement of said bracket in one direction and for effecting pivotal movement thereof in the opposite direction, a temperature sensitive bellows carried by said bracket for engaging said screw to operate said lever, a projection on said bracket, a bushing adjustably mounted on said support in engagement with said projection for pivotally adjusting said bracket to shift the position of said bellows relatively to said adjusting screw and thereby change the setting point of the controller, a dial carried by said casing in a plane parallel to the plane of movement of said lever, a key-operated shaft comprising yielding sections rotatably mounted on said dial and adapted for automatic coupling with said bushing when the casing is closed, to rotate said bushing and a pointer carried by said shaft for indicating on said dial the adjustment effected.

12. An automatic controller comprising a support, a device sensitive to temperature changes mounted thereon, a governing valve, a gravity-controlled lever for controlling the operation of said governing valve, an adjusting screw carried by said lever for engagement by said sensitive device whereby said lever is operated, said screw being adjustable on said lever to change the setting point of the controller and means for shifting the position of said sensitive device relatively to said screw to independently vary the setting point of the instrument or to supplement the adjustment effected by said screw.

13. In an automatic controller, the combination of a device sensitive to variations in temperature, a governing device, a transmission lever, an adjusting screw carried thereby for engagement by said sensitive device whereby said lever is operated and means on said lever for fixing said screw against unintentional rotation, and for permitting intentional rotation thereof.

14. In an automatic controller, the combination of a device sensitive to variations in temperature, a governing device, a transmission lever provided with a recess, an adjusting screw on said lever in registry with said recess arranged for engagement by said sensitive device whereby said lever is operated, a friction disk in the recess of said lever in engagement with said screw, a plug screw-threaded into said recess and a spring in the latter between and in engagement with said disk and plug for fixing said screw against unintentional rotation and for permitting intentional rotation thereof.

15. In an automatic controller, the combination of mechanism for automatically maintaining temperatures at a given point, means for adjusting said mechanism to vary the setting point of the controller, a dial including a scale reading in opposite directions from zero to a given point, a pointer co-operating with said scale to indicate the adjustment of said adjusting means and means for preventing the movement of said pointer beyond said given points in opposite directions.

16. An automatic controller comprising a support, a casing hinged thereon, an air valve mounted on said support, a gravity-controlled transmission lever pivoted upon said support to swing about an axis perpendicular thereto for controlling the operation of said valve, a bracket pivotally mounted upon said support, a temperature sensitive bellows carried by said bracket for operating said lever, a bushing adjustably mounted on said support for pivotally adjusting said bracket to shift the position of said bellows relatively to said lever and thereby vary the setting point of said controller, a dial on said casing located in a plane parallel with the plane of movement of said lever and provided with a scale reading in opposite directions from zero to a common point, a key-operated shaft journalled on said dial for rotating said bushing, a pointer carried by said shaft and cooperating with said scale to indicate the setting adjustment and a pivoted stop whereby the movements of said pointer in opposite directions over said scale are arrested in registry with said common point.

17. In an automatic controller, the combination of a support, temperature sensitive controlling mechanism on said support, a boss thereon provided with inlet and outlet connections and an air valve controlled by said mechanism and comprising an independent unit detachably fixed upon said boss in communication with the inlet and outlet connections thereof.

18. In an automatic controller, the combination of a support, temperature sensitive controlling mechanism on said support, a boss thereon provided with inlet and outlet connections, pins projecting from said boss and an air valve controlled by said mechanism and comprising an independent unit detachably fixed upon said boss, in communication with the inlet and outlet connections thereof, said valve having apertures adapted to fit over said projections to position it on said boss.

In testimony whereof I have hereunto set my hand.

FRANK J. BAST.